United States Patent Office 2,877,629
Patented Mar. 17, 1959

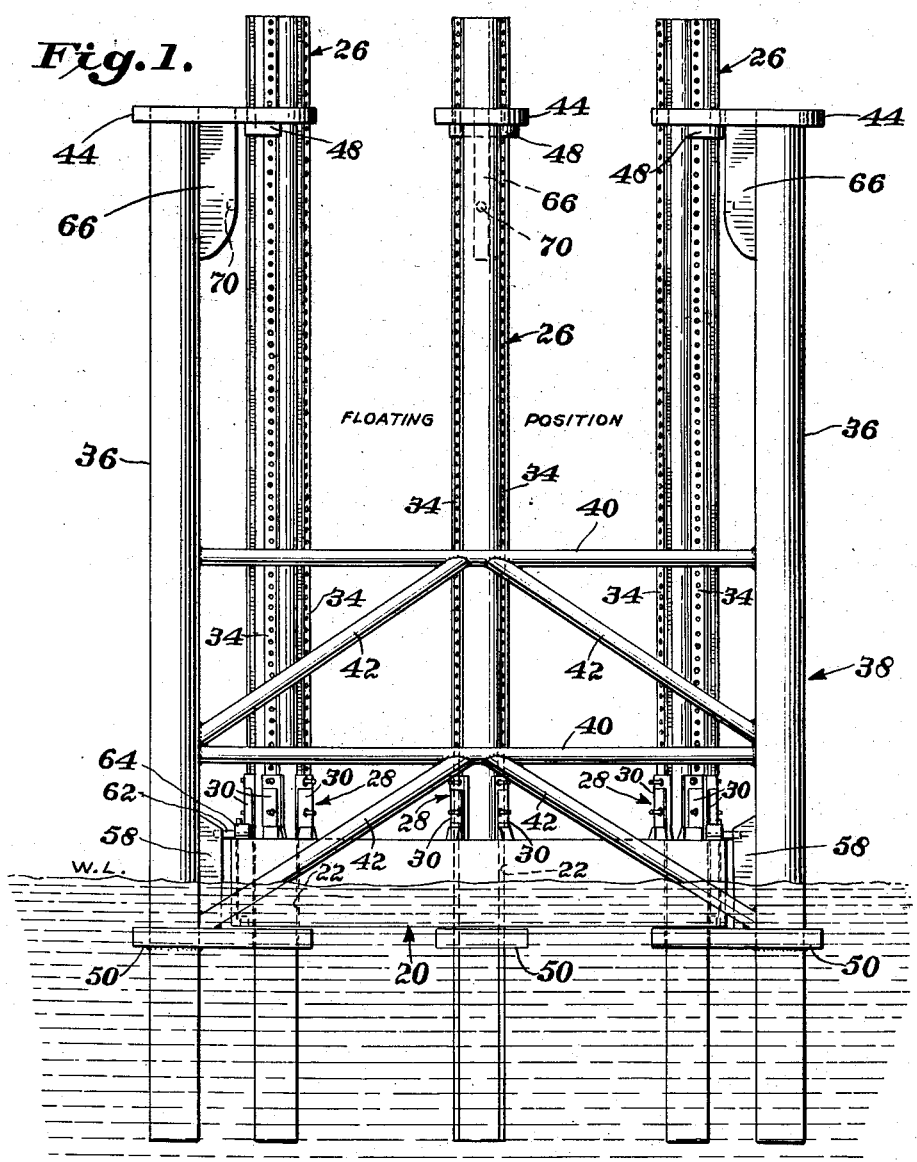

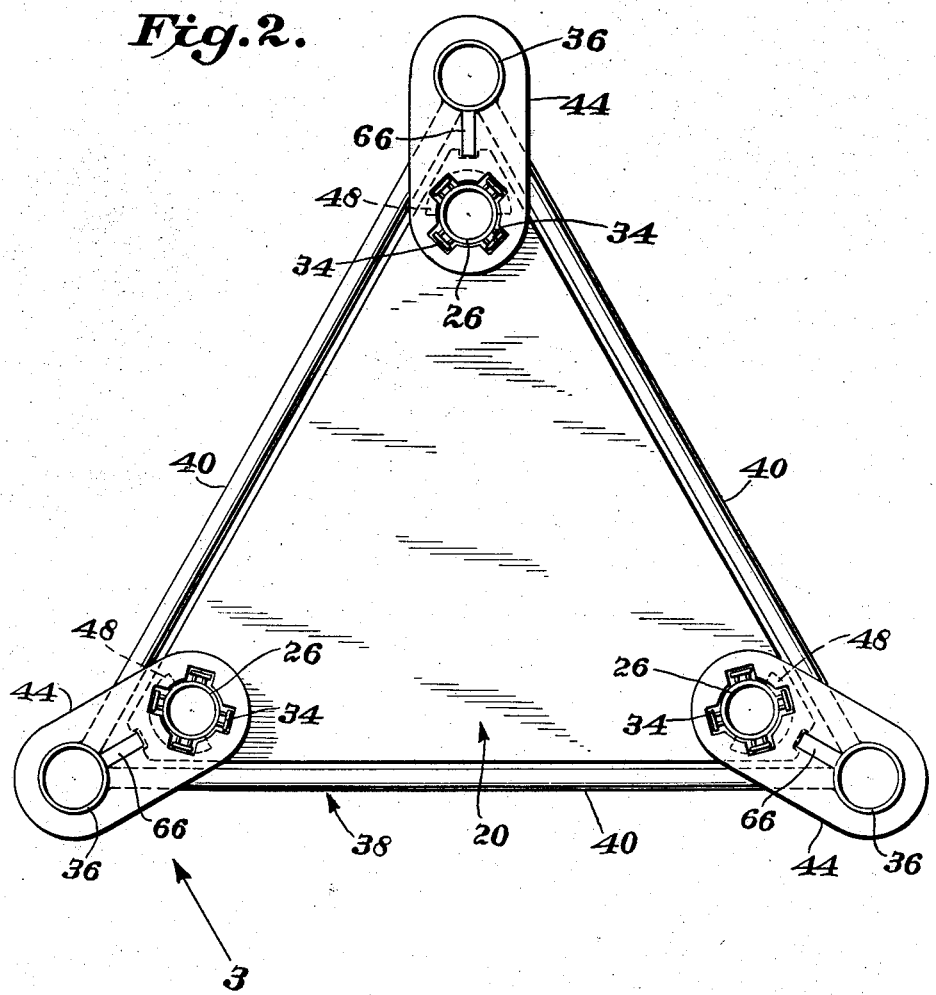

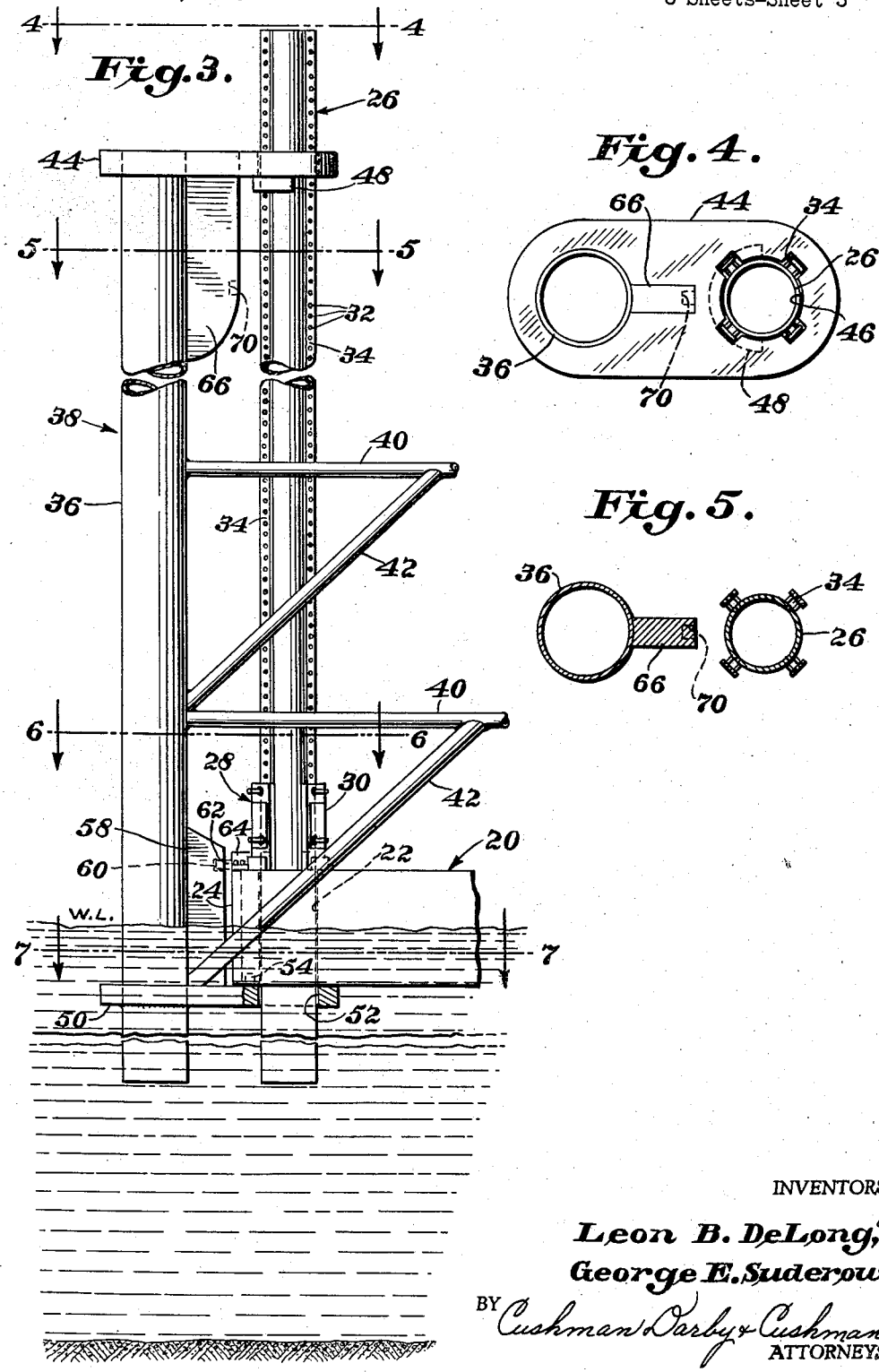

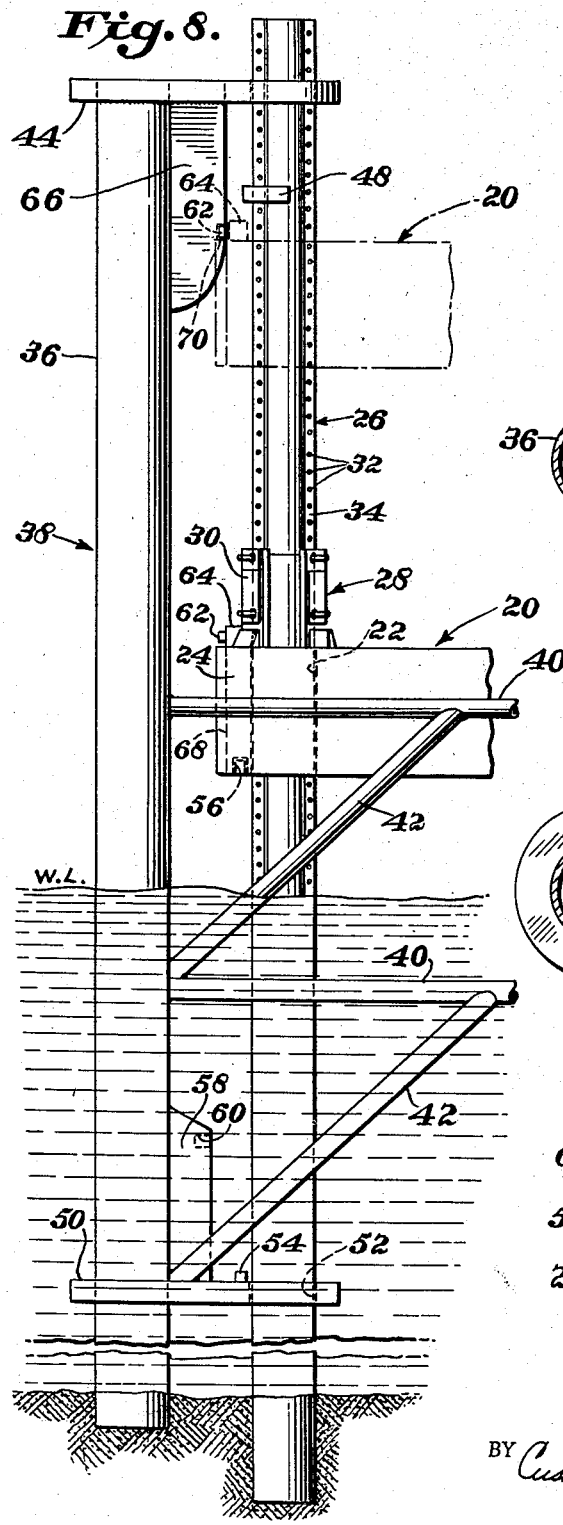
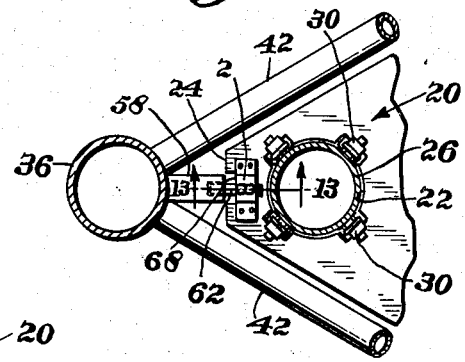
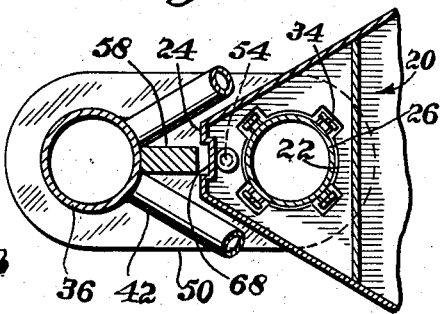
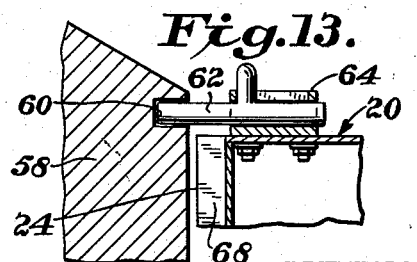
INVENTORS:
Leon B. DeLong,
George E. Suderow,
BY Cushman Darby & Cushman
ATTORNEYS.

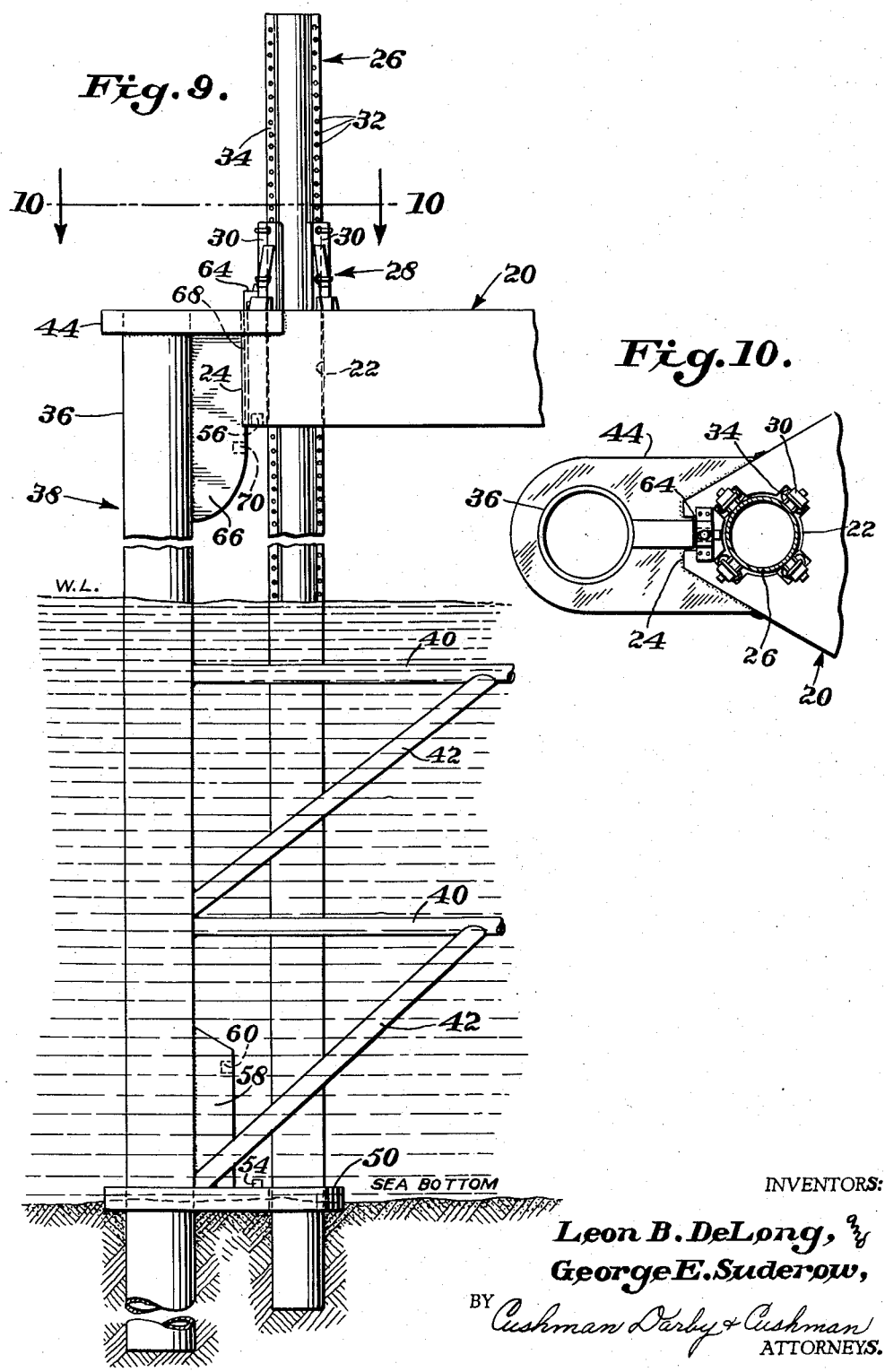

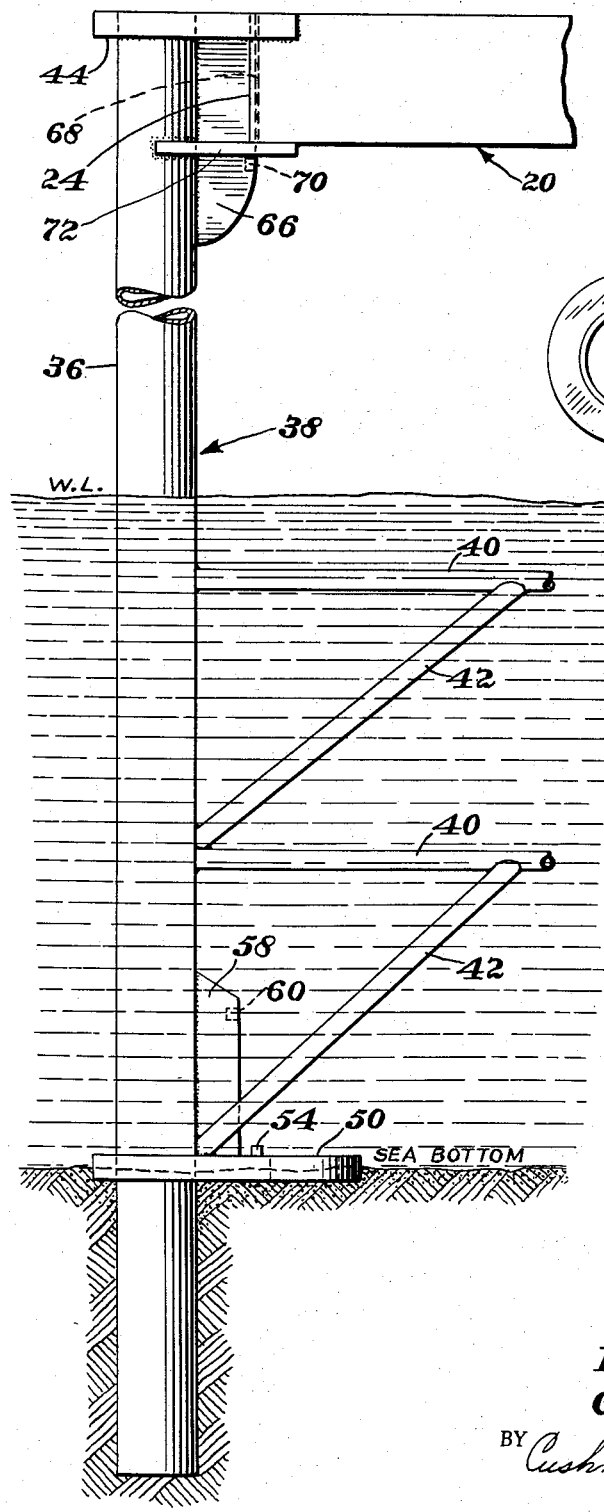
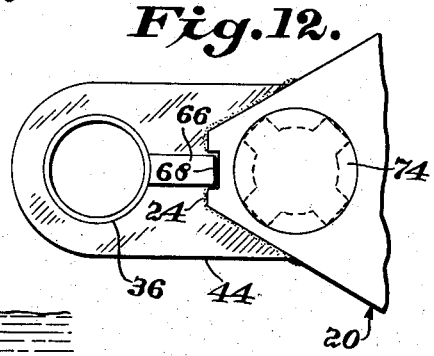

2,877,629

METHOD AND APPARATUS FOR ERECTING A DEEP WATER OFFSHORE PLATFORM

Leon B. De Long and George E. Suderow, New York, N. Y., assignors to De Long Corporation, New York, N. Y., a corporation of Delaware Application December 11, 1956, Serial No. 627,601

12 Claims. (Cl. 61—46.5)

This invention relates to an improved method and portable apparatus especially adapted for permanently erecting a marine platform at deep water sites. The invention makes use of supporting legs and jacking mechanisms of the general type disclosed, for example, in the copending application of Pointer, Serial No. 283,567, now Patent 2,775,869. In that application there is disclosed a buoyant platform-like body provided with a plurality of elongated supporting legs that are guided for vertical movement relative to the body, such movement being selectively effected or prevented by jacking devices. A platform of that nature can be towed to a selected marine site, the legs moved down into engagement with the marine bottom, and the body raised out of the water on the legs to provide a stable marine platform adapted for many and various uses.

A marine platform of the type disclosed in the aforementioned Pointer application encounters certain problems, however, when used in deep water, e. g., of the order of 100 feet or more. Such problems are even more acute when the platform is intended to be a permanent installation. In particular, when the body is elevated to its operative position above wave action, usually a height of the order of 50 feet above high tide level, and supported thereat on the supporting legs, the latter have a long, unsupported section extending between the marine bottom and the platform. These sections are subject to enormous bending forces created by wave or current action. Furthermore, wind forces acting on the platform create possible damaging forces between each leg and its guide means on the platform. It also is obvious that the problem of making the entire platform rigid and fixed against any swaying movement becomes more acute at greater water depths.

While a supporting leg may be of relatively small cross sectional area and still have sufficient strength to support the weight of the platform, it is not practical to greatly increase the cross sectional area of such a supporting leg or to make the same of heavier construction in order to strengthen such leg to an extent sufficient to adequately resist the aforementioned bending forces. Obviously, any large increase in cross sectional area of a supporting leg or making the same of heavier and consequently stronger construction not only will render the handling thereof extremely difficult, but also probably will make the structure too heavy to be manipulated by a jacking mechanism of practical size. Furthermore, strengthening the supporting legs, either by increased cross sectional area or by heavier construction, will not solve the platform rigidifying problem occasioned by the increased leverage of the legs at greater water depths.

While the aforedescribed problem has been attempted to be solved by the installation, after the platform has been erected, of bracing interconnecting the supporting legs, such installation cannot readily be accomplished under water where it is most needed, without the employment of divers. Obviously, such a procedure not only would be difficult, but also fraught with danger.

Accordingly, it is an object of this invention to provide an improved method and apparatus for erecting a marine platform at deep water sites, and wherein the erected platform will be stably and rigidly supported and have sufficient strength to withstand wave, wind, and current forces exerted thereon.

It is another object of this invention to provide method and apparatus which will accomplish the foregoing objects, wherein the method provides for ease of manipulation of the parts during the erection procedures, and also wherein the erected platform will have adequate rigidity.

Other objects and advantages of the invention will become apparent from the following description and accompanying drawings, in which:

Figure 1 is an elevational view of a portable assembly for erecting a marine platform in accordance with this invention. The assembly is shown in condition to be towed to an erection site.

Figure 2 is a plan view of the assembly shown in Figure 1.

Figure 3 is an enlarged, fragmentary, elevational view of a portion of the assembly shown in Figure 1 and taken in the direction of the arrow 3 in Figure 2.

Figure 4 is a plan view taken substantially on line 4—4 of Figure 3.

Figure 5 is a sectional view taken substantially on line 5—5 of Figure 3.

Figure 6 is a sectional view taken substantially on line 6—6 of Figure 3.

Figure 7 is a sectional view taken substantially on line 7—7 of Figure 3.

Figure 8 is a view corresponding to Figure 3 but illustrating a stage in the erection of the platform.

Figure 9 is a view corresponding to Figure 3 but illustrating a subsequent stage in the erection of the platform.

Figure 10 is a sectional view taken substantially on lines 10—10 of Figure 9.

Figure 11 is a view corresponding to Figure 3 but showing the final stage in the erection of the platform.

Figure 12 is a plan view taken substantially on line 12—12 of Figure 11.

Figure 13 is an enlarged fragmentary sectional view taken on line 13—13 of Figure 6.

*The portable assembly*

Referring now to Figures 1 to 7 of the drawings, there is shown a floating portable assembly embodying this invention which can be towed to a selected marine site and there manipulated to erect a strong and rigid permanent platform at the site. The assembly includes a platform-like buoyant body 20 of generally barge-like steel construction. For purposes of illustration here, the body 20 has been shown as having in general the configuration of an equilateral triangle in plan view. It will be realized, however, that other configurations of the buoyant body are possible. The buoyancy of the body 20 is sufficient to support not only itself but also all of the devices and structures used to erect and to finally support the body on the marine bottom in an elevated position above water level.

The body 20 is provided, adjacent its peripheral or horizontal outline, with a plurality of vertical guiding openings or wells 22 that extend completely through the body. For purposes of illustration here, one of such wells 22 is located at each corner of the body 20. Each such corner preferably is of blunt formation as best shown in Figure 6 to provide a short sidewall section 24 parallel to the opposite long side of the body 20. Guided in each well 22, for substantially vertical movement relative to the body 20, is a temporary body-supporting leg 26, preferably of tubular steel construction, of a length substantially greater than the water depth at an erection site. The length of each such leg 26 is at least equal to such water depth plus the depth to which the leg will penetrate into the marine bottom under the weight of the body 20 and also plus the desired elevational height of the body above water after it has been erected.

Vertical movement of each leg 26 relative to the body 20 can be selectively effected or restrained by means of a suitable jacking mechanism 28 detachably mounted on the body adjacent each leg and releasably engageable therewith. Such mechanisms may be of the type disclosed in the aforementioned Pointer application, but illustrated here is the improved type disclosed in greater detail in the copending application of Suderow, Serial No. 523,323. Each jacking mechanism 28 may include four jacks 30 evenly spaced about each leg 26 and operable in unison. For purposes of disclosure here, it is sufficient to point out that each jack 30 includes locking bolts or pins (not shown) that can be reciprocated transversely of the corresponding leg 26 into or out of locking engagement with a longitudinal row of openings 32 in the leg. By suitable operation of each jacking mechanism 28, the corresponding leg 26 can be moved step-by-step either upwardly or downwardly relative to the body 20 or firmly locked against such movement. The rows of pin-receiving openings 32 in each leg 26 may be formed in the webs of channel elements 34, best shown in Figure 5, which extend longitudinally of the leg and have their flanges welded thereto. The body wells 22 generally conform to the cross sectional configuration of the legs 26.

In the initial condition of the assembly, as shown in Figures 1 and 3, and during towage thereof to an erection site, the legs 26 are maintained in an elevated position relative to the body 20 with their lower ends projecting beneath the body a distance preferably equal to no more than that to which the permanent legs 36 will penetrate into the marine bottom after the platform has been erected, as later described.

Disposed about the body 20 and spaced generally outboard thereof is a pre-assembled rigid openwork structure 38 employed, as later described, to permanently support the body above water at the erection site. The structure 38 is movable vertically relative to the body 20, but can be supported thereon while the entire assembly is being towed to an erection site. The structure 38 includes a plurality of permanent legs 36 that also may be of tubular steel construction, as shown in Figures 1 and 2, but preferably are of greater diameter and, hence, stronger than the temporary legs 26. The length of the permanent legs 36 may be slightly less than that of the temporary legs 26 and one permanent leg is disposed adjacent each temporary leg but located outboard of the body 20. Horizontal and cross bracing members 40 and 42, also located outboard of the body 20, interconnect the permanent legs 36 to form the rigid openwork structure 38. Preferably, the bracing members 40 and 42 are located in an elevational zone on the structure 38 which will be underwater when the platform is erected as later described.

Each permanent leg 36 is provided, at the upper end thereof, with a yoke-like member 44 that is rigidly secured, as by welding, to the leg and extends laterally therefrom. The outer end of the member 44 has an opening 46, best shown in Figure 4, of the same configuration as the body wells 22 and within which the upper end of the corresponding temporary leg 26 is slidably received. Immediately beneath the member 44 each temporary leg 26 is provided with a removable supporting pad 48 engaged with the undersurface of the member 44 so that the entire openwork structure 38 can be supported on the upper ends of the temporary legs. Thus, the openwork structure 38 is supported in an elevated position and with the lower ends of the permanent legs 36 on a level with the lower ends of the temporary legs 26 while the assembly is being towed to an erection site, as shown in Figures 1 and 3. The aforementioned supporting pads 48 may be bolted or otherwise suitably removably secured to the temporary legs 26. For this purpose, the pads 48 may even be welded to the legs 26 and cut away therefrom, as by an appropriate torch (not shown), at the necessary time during the erection of the platform as later described.

Another yoke-like member 50 is secured to each permanent leg 36 at an elevation thereon which will be immediately below the body 20 when the structure 38 is in the elevated position shown in Figures 1 and 3. An opening 52 (Figure 3) in the lower yoke is disposed beneath and in alignment with the corresponding well 22 and leg 26, and slidably receives and guides the latter. Thus, the two yoke members 44 and 50 serve as guides to maintain each pair of corresponding temporary and permanent legs 26 and 36 in spaced parallel relation. Preferably, the lower yoke members 50 have upstanding pins 54 thereon which project into appropriate sockets 56 (Figures 8 and 9) in the undersurface of the body 20, when the structure 38 is supported in its elevated position, as shown in Figures 1 and 3, to assist in maintaining the openwork structure and the body in their proper horizontal relationship while the entire assembly is being towed to a marine site. Immediately above the lower yoke member 50, each permanent leg 36 has secured thereto, as by welding, a longitudinal or vertical rib 58 facing and disposed at right angles to the corresponding sidewall section 24 of the body 20. The rib 58 is provided on its outer edge with a socket 60 for the reception of the outer end of a locking bolt 62 reciprocably mounted in an appropriate bearing 64 secured to the body, as best shown in Figure 13. Thus, when all of the bolts 62 are inserted into their respective rib sockets 60, the entire openwork structure 38 can be supported substantially directly on the body 20 independently of the temporary legs 26.

At its upper end and immediately beneath the top yoke member 44 each permanent leg 36 is provided with another longitudinal rib 66 in vertical alignment with the lower rib 58. The top ribs 66 are of greater dimension, radially of the corresponding legs 36, than the lower ribs 58, so that each upper rib will be received within a corresponding groove or channel 68 in the body sidewall section 24 when the body 20 is in horizontal alignment with the upper ribs, as will be later described. Additionally, the outer edge of each upper rib 66 is provided, adjacent the lower portion thereof, with a socket 70 adapted to receive the locking bolt 62 on the body.

As will be seen from an inspection of Figure 3, the permanent legs 36 extend for a considerable distance below their lower yoke members 50. This distance preferably is substantially equal to the distance to which the permanent legs will be imbedded in or will penetrate the marine bottom to afford a firm bearing for supporting the weight of the body 20 and all equipment or accessories intended to be mounted thereon. As previously described, the temporary legs 26 may extend beneath the undersurface of the body 20 to the level of the lower ends of the permanent legs 36 when the structure 38 is in its elevated position. As also previously mentioned, however, the temporary legs 26 are of a greater length than the permanent legs 36 and extend upwardly above the top yoke members 44 for a considerable distance. The reasons for this greater length will become evident hereinafter.

With the parts in the position best shown in Figure 3, the entire assembly may be towed to a desired erection site. It will be noted that during such a tow the temporary legs 26 are supported in an elevated position off of the marine bottom by the jacking mechanisms 28, while the entire openwork supporting structure 38 may be supported in part by the temporary legs and in part directly on the body 20 by the locking bolts 62, or the weight or load of the entire openwork structure may be taken by either the temporary legs or the locking bolts. In any event, the temporary legs 26 together with the locking bolts 62 and the positioning pins 54 rigidly secure the openwork structure 38 to the body 20 and prevent any appreciable relative movement therebetween which might be occasioned by rough seas. It also will be noted that since the upper ends of the temporary legs 26 are embraced by the top yoke members 44, rocking movements of the temporary legs relative to the body 20, occasioned by rough seas, also are effectively prevented.

Erection procedure

After the entire assembly has reached a desired marine site and has been properly oriented, the locking bolts 62 are withdrawn from engagement with the lower rib sockets 60 so that the supporting structure 38 is supported solely on the temporary legs 26. The jacking mechanisms 28 then are operated in unison to move the temporary legs 26 step-by-step downwardly until such legs engage the marine bottom and are supported thereby. Because the entire openwork structure 38 is supported on the temporary legs by the supporting pads 48, the openwork supporting structure will move downwardly with the temporary legs 26 until the lower ends of the permanent legs 36 also engage with the marine bottom. At this point, the jacking mechanisms 28 are operated in unison to raise the body 20 out of the water on the temporary legs 26 as shown in Figure 8. In connection with this operation, it will be seen that as the weight of the body 20 becomes borne by the temporary legs 26, the latter probably will be forced deeper into the marine bottom. Consequently, and as pointed out heretofore, it is desirable that a considerable length of the temporary legs 26 extend above the top yoke members 44 so that disengagement therebetween will not occur on such downward movement of the temporary legs relative to the structure 38.

The body 20 is continued to be raised on the temporary legs 26 into a position wherein the pads 48 are accessible from the body 20. The pads 48 are then removed to permit the supporting structure 38 to move downwardly relative to the temporary legs 26, as later described. Raising of the body 20 on the temporary legs 26 is then continued until the locking bolts 62 become aligned with the sockets 70 in the upper ribs 66 on the permanent legs 36. At this time the locking bolts 62 are inserted into the upper rib sockets 70, as shown by dotted lines in Figure 8, so that by appropriate operation of the jacking mechanisms 28 the entire weight of the body 20 can be supported directly on the openwork structure 38. Such weight normally will serve to force the permanent legs 36 deeper into the marine bottom.

In order to prevent possible future settling of the permanent legs 36 under the weight of the body 20 and any accessories or equipment that may be mounted thereon, it is desirable for the permanent legs to be driven to a bearing in the marine bottom firmer than that obtained by the weight of the body alone. Consequently, water jets, or excavation procedures from within each permanent leg 36, may be employed to sink the latter to a firm bearing in the marine bottom, preferably to a depth wherein the bottom yoke members 50 also engage the marine bottom, as is best shown in Figure 9. In this position, it will be seen that the bottom yoke members 50 provide an increased area of engagement between the supporting structure 38 and the marine bottom and also afford a broader base of such engagement so that the openwork structure can be firmly secured against any possible future settlement that might be occasioned by relatively soft bottom conditions. It also will be noted that the yoke members 44 and 50 guide the entire structure 38 during its downward movement relative to the temporary legs 26.

After the aforementioned operations have been completed and the entire openwork structure 38 has been properly leveled, the jacking mechanisms 28 are manipulated to again support the body 20 on the temporary legs 26 so that the locking bolts 62 can be pulled out of engagement with the upper rib sockets 70. The outer ends of the top yoke members 44 are then cut away, as by an appropriate cutting torch (not shown), to conform to the configuration of the corresponding corner of the body 20, as is best shown in Figure 10, and the jacking mechanisms 28 are operated to raise the body on the temporary supporting legs 26 until the upper surface or deck of the body 20 is flush with the upper surface of the top yoke members. It also will be noted that during this last raising movement the interengagement between the ribs 66 and the channels 68 properly aligns the body 20 within the supporting structure 38. Thereupon, the body 20 is firmly secured, as by welding, to all of the top yoke members 44 and to the upper ribs 66, to thereby support the body on the openwork structure 38. Additionally, plate-like supporting brackets 72 (Figure 11) may be engaged with the undersurface of the body 20, secured thereto, as by welding, and also secured to the adjacent portions of the permanent legs 36 and upper ribs 66 to more firmly secure the body 20 to the openwork structure 38.

After the foregoing securing operations have been accomplished, the jacking mechanisms 28 are operated to elevate the temporary supporting legs 26 into a position where such legs can be removed from their corresponding wells 22, as by a crane or the like (not shown), and transported away from the erected platform for use elsewhere. The jacking mechanisms 28, which are detachably mounted on the platform, are also removed for use elsewhere, and the wells 22 in the body 20 can then be suitably capped, as by welding a conforming plate 74 therein flush with the upper surface or deck of the body 20, as shown in Figure 12. Additionally, the bearings 64, which are detachably secured to the body 20, together with the locking bolts 62 can be removed from the deck of the body so that such deck will provide an unobstructed working area.

On completion of the foregoing erection procedure, it will be seen that there is provided a stable, fixed, rigid, and strong permanent marine platform that is suitable for a variety of uses. It further will be noted that the bracing members 40 and 42 for the legs 36 preferably are disposed below water level so that they will not interfere with the movements of vessels beneath the platform while at the same time affording an extremely effective bracing for the permanent legs that will serve to rigidify the entire platform.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. The method of erecting an above-water platform at a marine site, the steps comprising: floating to the site an assembly comprising a buoyant platform-like body, an openwork permanent body-supporting rigid structure including a plurality of vertical supporting members interconnected by cross bracing of a height greater than the water depth at the site disposed about the horizontal outline of the body and movable vertically relative thereto, and a plurality of upstanding temporary body-supporting legs of greater length than said water depth mounted on the platform for substantially vertical movement relative thereto, the assembly also including means for temporarily supporting the structure solely on the legs for vertical movement therewith relative to the body; supporting the legs and the structure on the body in an elevated position out of engagement with the marine bottom during the floating step; supporting the structure solely on the legs at the site and lowering the legs and the structure simultaneously into engagement with the marine bottom; raising the body on the legs to an elevation above water; and transferring the support of the elevated body from the legs to the structure.

2. The method of erecting an above-water platform at a marine site, the steps comprising: floating to the site an assembly comprising a buoyant platform-like body, an openwork permanent body-supporting rigid structure including a plurality of vertical supporting members interconnected by cross bracing of a height greater than the water depth at the site disposed about the horizontal outline of the body and movable vertically relative thereto, and a plurality of upstanding temporary body-supporting legs of greater length than said water depth mounted on the platform for substantially vertical movement relative thereto, the assembly also including means for temporarily supporting the structure solely on the legs for vertical movement therewith relative to the body; supporting the legs and the structure on the body in an elevated position out of engagement with the marine bottom during the floating step; supporting the structure solely on the legs at the site and lowering the legs and the structure simultaneously into engagement with the marine bottom; raising the body on the legs to an elevation above water; transferring the support of the elevated body from the legs to the structure and effecting a firm bearing of the latter in the marine bottom; and rigidly securing the body to the structure.

3. The method of erecting an above-water platform at a marine site, the steps comprising: floating to the site an assembly comprising a buoyant platform-like body, an openwork permanent body-supporting rigid structure including a plurality of vertical supporting members interconnected by cross bracing of a height greater than the water depth at the site disposed about the horizontal outline of the body and movable vertically relative thereto, and a plurality of upstanding temporary body-supporting legs of greater length than said water depth mounted on the platform for substantially vertical movement relative thereto, the assembly also including means for temporarily supporting the structure solely on the legs for vertical movement therewith relative to the body; supporting the legs and the structure on the body in an elevated position out of engagement with the marine bottom during the floating step; supporting the structure solely on the legs at the site and lowering the legs and the structure simultaneously into engagement with the marine bottom; raising the body on the legs to an elevation above water; transferring the support of the elevated body from the legs to the structure and rigidly securing the body thereto; and removing the legs.

4. A portable assembly for the erection of an above-water marine platform, comprising: a buoyant platform-like body; a plurality of upstanding temporary body-supporting legs removably mounted on said body for substantially vertical movement relative thereto, said legs being of greater length than the water depth at an erection site; power-operated means removably connected to said body for selectively effecting or restraining said relative movement; an openwork permanent body-supporting rigid structure of greater height than said water depth, surrounding the horizontal outline of said body, and vertically movable relative thereto; means for temporarily supporting said structure solely on said legs for vertical movement therewith relative to said body; and means for supporting said body on said structure adjacent the upper end thereof.

5. The structure defined in claim 4 including means mounted on the body and the structure, adjacent the lower end thereof, for releasably supporting said structure on said body.

6. The structure defined in claim 4 in which the power-operated means comprises jacking mechanisms, one for each leg and each releasably engageable therewith.

7. The structure defined in claim 4 in which the temporary supporting means is disposed adjacent the upper end of each leg and including guide means for each temporary leg secured to the structure adjacent the lower end thereof and below the body.

8. The structure defined in claim 4 in which the temporary legs are located adjacent the periphery of the body, and the openwork structure includes upright, permanent supporting legs, one adjacent each of said temporary legs, and bracing interconnecting said permanent legs.

9. The structure defined in claim 8 in which the supporting means comprises a member on and adjacent the upper end of each permanent leg and rigidly securable to an adjacent portion of the body when horizontally aligned therewith.

10. A portable assembly for the erection of an above-water marine platform, comprising: a buoyant platform-like floating body; a plurality of upstanding legs for stably and temporarily supporting said body on the marine bottom, said legs being of greater length than the water depth at an erection site; guide means on said body adjacent the periphery thereof removably mounting said legs for substantially vertical movement relative to said body; power-operated means removably connected to said body for selectively effecting or restraining said relative movement and supporting said legs in an elevated position wherein the lower ends thereof are out of engagement with the marine bottom; an openwork rigid structure disposed about the horizontal outline of said body and vertically movable relative thereto for permanently supporting said body, said structure including a plurality of upright permanent supporting legs of greater height than said water depth, one disposed adjacent each of said temporary legs, and bracing interconnecting said permanent legs; means on said body adjacent each of said permanent legs detachably connecting the latter to said body against relative vertical movement therebetween and supporting said structure in an elevated position wherein the lower ends of said permanent legs are out of engagement with the marine bottom; yoke means secured to the upper end of each of said permanent legs and slidably embracing the upper end of the adjacent temporary leg; and means removably secured to the upper end of each of said temporary legs and supportingly engaging the corresponding yoke means.

11. The structure defined in claim 10 including additional yoke means secured to each permanent leg adjacent the lower end thereof and slidably embracing the corresponding temporary leg below the body.

12. The structure defined in claim 10 in which detachable connecting means is also operable to engage the permanent legs adjacent the upper ends thereof to support the body on the structure.

References Cited in the file of this patent

UNITED STATES PATENTS 2,592,448     McMenimen _____ Apr. 8, 1952

OTHER REFERENCES

"Radar Platforms: A Challenge to Builders," an article in Engineering News-Record for Nov. 25, 1954, pps. 27, 28 and 30.